(12) United States Patent
Han

(10) Patent No.: US 8,031,776 B2
(45) Date of Patent: Oct. 4, 2011

(54) METHOD AND APPARATUS FOR PREDECODING AND DECODING BITSTREAM INCLUDING BASE LAYER

(75) Inventor: Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1814 days.

(21) Appl. No.: 11/180,634

(22) Filed: Jul. 14, 2005

(65) Prior Publication Data

US 2006/0013300 A1 Jan. 19, 2006

(30) Foreign Application Priority Data

Jul. 15, 2004 (KR) .................. 10-2004-0055253

(51) Int. Cl.
*H04N 7/12* (2006.01)
(52) U.S. Cl. ................................. 375/240.19
(58) Field of Classification Search . 375/240.01–240.29
See application file for complete search history.

(56) References Cited

U.S. PATENT DOCUMENTS

| | | | | |
|---|---|---|---|---|
| 6,057,884 | A * | 5/2000 | Chen et al. | 375/240.16 |
| 6,493,387 | B1 * | 12/2002 | Shin et al. | 375/240.1 |
| 7,317,759 | B1 * | 1/2008 | Turaga et al. | 375/240.01 |
| 2002/0090028 | A1 | 7/2002 | Comer et al. | |
| 2003/0195977 | A1 | 10/2003 | Liu et al. | |
| 2005/0047503 | A1 | 3/2005 | Han et al. | |
| 2005/0084015 | A1 | 4/2005 | Han et al. | |

FOREIGN PATENT DOCUMENTS

| | | |
|---|---|---|
| JP | 2000-078573 A | 3/2000 |
| JP | 2001-345847 A | 12/2001 |
| JP | 2004-509581 A | 3/2004 |
| KR | 2002-0081777 A | 10/2002 |
| KR | 10-2004-0054747 A | 6/2004 |
| WO | 02/25954 A2 | 3/2002 |

OTHER PUBLICATIONS

Heiko Schwarz, et al. "Subband Extension of H. 264/AVC", Joint Video Team (JVT) of ISO/IEC MPEG & ITU-T VCEG 11th Meeting [JVT-K023], Munich Germany, Mar. 15-19, 2004, p. 1, 32-34.
Communication dated Dec. 1, 2009 issued by the Japanese Patent Office in counterpart application No. 2007-521390.
Woo-Jin Han, et al., "Performance Improvement of Wavelet-Based Scalable Video Coder Based on Pre-Decoder Side Rate-Distortion Optimization", Proceedings of the $3^{rd}$ IEEE International Symposium on Signal Processing and Information Technology, pp. 211-214, Dec. 14-17, 2003.
Dapeng Wu, et al., "Scalable Video Coding and Transport Over Broad-Band Wireless Networks", Proceedings of the IEEE, vol. 89, No. 1, pp. 6-20, Jan. 2001.
M. Van Der Schaar, et al., "H Ybrid Temporal-SNR Fine-Granular Scalability for Internet Video ", IEEE Trans. on Circuits Systems for Video Technology, vol. 11, No. 3, pp. 318-331, Mar. 2001.
Communication dated Jun. 8, 2010, issued in counterpart Japanese Application No. 2007-521390.

* cited by examiner

*Primary Examiner* — David Czekaj
(74) *Attorney, Agent, or Firm* — Sughrue Mion, PLLC

(57) ABSTRACT

A method and apparatus for extracting a higher quality video stream for a given bit-rate by replacing a specific frame by a base layer frame at a predecoder are provided. A predecoding method performed by the predecoder includes selecting a mode by determining frames to be skipped according to a predetermined criterion among frames located at positions where the base layer exists, and extracting a portion of the bitstream according to the selected mode and extraction conditions.

7 Claims, 18 Drawing Sheets

METHOD AND APPARATUS FOR PREDECODING AND DECODING BITSTREAM INCLUDING BASE LAYER

CROSS-REFERENCE TO RELATED APPLICATION

This application claims priority from Korean Patent Application No. 10-2004-0055253 filed on Jul. 15, 2004, in the Korean Intellectual Property Office, the disclosure of which is incorporated herein by reference in its entirety.

BACKGROUND OF THE INVENTION

1. Field of the Invention

Apparatuses and methods consistent with the present invention relate to a method and apparatus for predecoding and decoding a bitstream including a base layer, and more particularly, to extracting a higher quality video stream for a given bit-rate by replacing a specific frame by a base layer frame at a predecoder.

2. Description of the Related Art

With the development of information communication technology including the Internet, video communication as well as text and voice communication has explosively increased. Conventional text communication cannot satisfy various user demands, and thus multimedia services that can provide various types of information such as text, pictures, and music have increased. Multimedia data requires a large capacity of storage media and a wide bandwidth for transmission since the amount of multimedia data is usually large in relative terms to other types of data. Accordingly, a compression coding method is required for transmitting multimedia data including text, video, and audio. For example, a 24-bit true color image having a resolution of 640*480 needs a capacity of 640*480*24 bits, i.e., data of about 7.37 Mbits, per frame. When an image such as this is transmitted at a speed of 30 frames per second, a bandwidth of 221 Mbits/sec is required. When a 90-minute movie based on such an image is stored, a storage space of about 1200 Gbits is required. Accordingly, a compression coding method is a requisite for transmitting multimedia data including text, video, and audio.

In such a compression coding method, a basic principle of data compression lies in removing data redundancy. Data redundancy is typically defined as spatial redundancy in which the same color or object is repeated in an image, temporal redundancy in which there is little change between adjacent frames in a moving image or the same sound is repeated in audio, or mental visual redundancy taking into account human eyesight and perception dull to high frequency. Data can be compressed by removing such data redundancy. Data compression can largely be classified into lossy/lossless compression, according to whether source data is lost, intraframe/interframe compression, according to whether individual frames are compressed independently, and symmetric/asymmetric compression, according to whether time required for compression is the same as time required for recovery. In addition, data compression is defined as real-time compression when a compression/recovery time delay does not exceed 50 ms and as scalable compression when frames have different resolutions. As examples, for text or medical data, lossless compression is usually used. For multimedia data, lossy compression is usually used. Meanwhile, intraframe compression is usually used to remove spatial redundancy, and interframe compression is usually used to remove temporal redundancy.

Transmission performance is different depending on transmission media. Currently used transmission media have various transmission rates. For example, an ultrahigh-speed communication network can transmit data of several tens of megabits per second while a mobile communication network has a transmission rate of 384 kilobits per second. In related art video coding methods such as Motion Picture Experts Group (MPEG)-1, MPEG-2, H.263, and H.264, temporal redundancy is removed by motion compensation based on motion estimation and compensation, and spatial redundancy is removed by transform coding. These methods have satisfactory compression rates, but they do not have the flexibility of a truly scalable bitstream since they use a reflexive approach in a main algorithm. Accordingly, in recent year, wavelet video coding has been actively researched. Scalability indicates the ability to partially decode a single compressed bitstream, that is, the ability to perform a variety of types of video reproduction.

Scalability includes spatial scalability indicating a video resolution, Signal to Noise Ratio (SNR) scalability indicating a video quality level, temporal scalability indicating a frame rate, and a combination thereof.

The spatial scalability and SNR scalability can be implemented using wavelet transform and quantization, respectively. The temporal scalability is realized using motion compensated temporal filtering (MCTF) or unconstrained MCTF (UMCTF).

FIG. 1 shows the entire configuration of a conventional video coding system supporting the above-mentioned scalabilities. Referring to FIG. 1, an encoder 40 encodes an input video 10 into a bitstream 20 by performing temporal filtering, spatial transform, and quantization. A predecoder 50 truncates a portion of the bitstream 20 received from the encoder 40 or extracts a bitstream 25 according to extraction conditions such as quality, resolution or frame rate determined considering environment of communication with and performance of a decoder 60, thereby implementing scalability for texture data in a simple manner.

The decoder 60 performs the inverse operation of the encoder 40 on the extracted bitstream 25 and generates an output video 30. When the processing power of the decoder 60 is insufficient to support real time decoding of the entire bitstream 20 generated by the encoder 40, the decoder 60 may extract the bitstream 25. Of course, the extraction may be performed by both the predecoder 50 and the decoder 60.

This scalable video coding allows a bit-rate, a resolution, and a frame rate to be all changed by the predecoder 50 and provides significantly high compression ratios at a high bit-rate. However, the scalable video coding exhibits significantly lower performance than conventional coding schemes such as MPEG-4 and H.264 at an insufficient bit-rate because of several reasons.

The degraded performance fundamentally results from a feature of a wavelet transform exhibiting lower degradation at a low resolution than discrete cosine transform (DCT). Another important reason is that encoding is optimized for a specific bit-rate in scalable video coding supporting various bit-rates while the encoding performance is degraded at other bit-rates.

Accordingly, there is a need to develop an efficient predecoding method to reduce degradation in quality, resolution or frame-rate.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides a scalable video coding method providing high performance at both low and high bit-rates.

The present invention also provides a method for allocating bits saved by efficient predecoding to another frame.

According to an aspect of the present invention, there is provided a method for predecoding a bitstream containing a base layer, including determining frames to be skipped according to a predetermined criterion among frames located at positions where the base layer exists, and extracting a portion of the bitstream according to the determined frames and extraction conditions.

The criterion may be a transmissible bit-rate determined based on the transmission condition of a network connected to a decoder.

The determining of the frames to be skipped comprises determining that all frames located at the positions of the base layer may be skipped when the bit-rate is below a first threshold.

The determining of the frames to be skipped comprises determining that high-pass frames may be skipped among the frames located at the positions of the base layer when the bit-rate is between first and second thresholds.

According to another aspect of the present invention, there is provided a method for decoding a bitstream containing a base layer and with some skipped frames, the method including reconstructing the base layer by applying a predetermined codec to information about the base layer in the bitstream, generating residual frames obtained by skipping some frames using information other than the base layer in the bitstream, inserting the base layer into the positions of the skipped frames, and performing inverse temporal filtering on the inserted base layer and the residual frames and reconstructing a video sequence.

The generating of the residual frames may include performing inverse quantization on texture information other than the base layer in the bitstream and outputting transform coefficients, and inversely transforming the transform coefficients into transform coefficients in a spatial domain.

The base layer may be inserted after being upsampled to the resolution of the residual frame.

The inverse temporal filtering is performed by calculating the sum of the base layer and the residual frame when difference coding is used to generate the residual frame and by calculating the sum of the residual frame and a predicted frame obtained using a reference frame number and a motion vector when temporal predictive coding is used to generate the residual frame.

The predetermined codec may be a H.264 (Advanced Video coding) codec. The upsampling may be performed using inverse wavelet transform.

According to still another aspect of the present invention, there is provided a predecoder for extracting a portion of a bitstream containing a base layer, including a mode selection module determining frames to be skipped according to a predetermined criterion among frames located at positions where the base layer exists, and a bitstream extraction module extracting a portion of the bitstream according to the selected mode and extraction conditions.

According to yet another aspect of the present invention, there is provided a video decoder for decoding a bitstream containing a base layer and with some skipped frames, the video decoder including a base layer decoder reconstructing the base layer by applying a predetermined codec to information about the base layer in the bitstream, an inverse spatial transform module generating residual frames obtained by skipping some frames using information other than the base layer in the bitstream, and an inverse temporal filtering module inserting the base layer into the positions of the skipped frames and performing inverse temporal filtering on the inserted base layer and the residual frames in order to reconstruct a video sequence.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
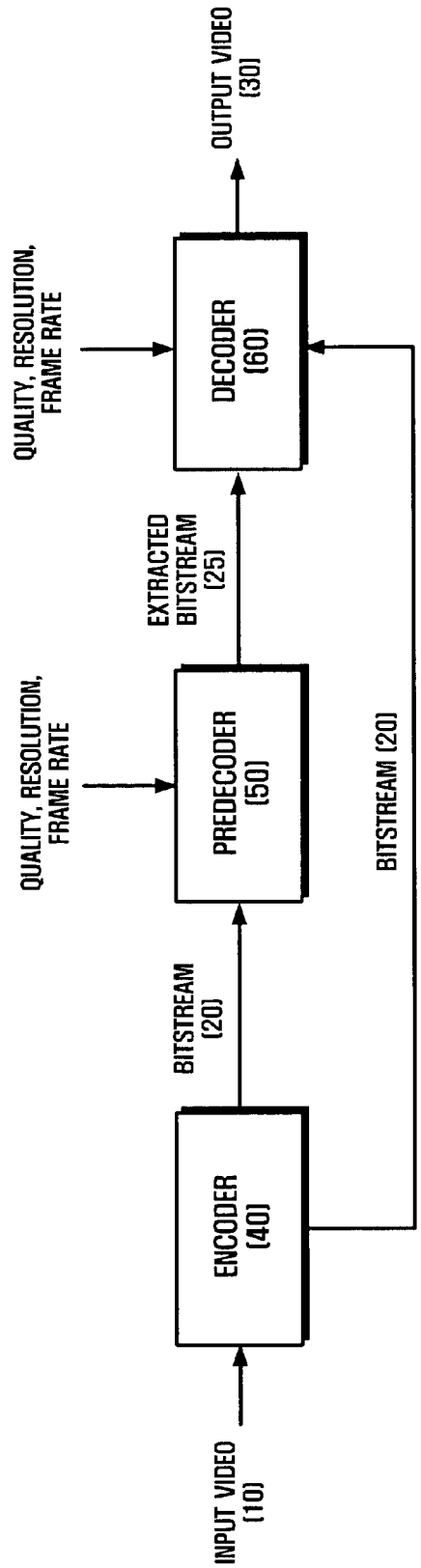
FIG. 1 shows the entire configuration of a conventional video coding system.

The present invention will now be described more fully with reference to the accompanying drawings, in which exemplary embodiments of this invention are shown. Various aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Throughout this specification, a base layer refers to a video sequence having lower frame rate and resolution than the highest resolution and frame rate available in a bitstream actually generated by a scalable video encoder. In an exemplary embodiment of the present invention, the base layer has the lowest frame rate and resolution as will be hereinafter described, although not necessary.

In the specification, the lowest frame rate, the lowest resolution, or the highest resolution is determined based on an actually generated bitstream and distinguished from the counterpart supported by a scalable video encoder.

Figure 2:
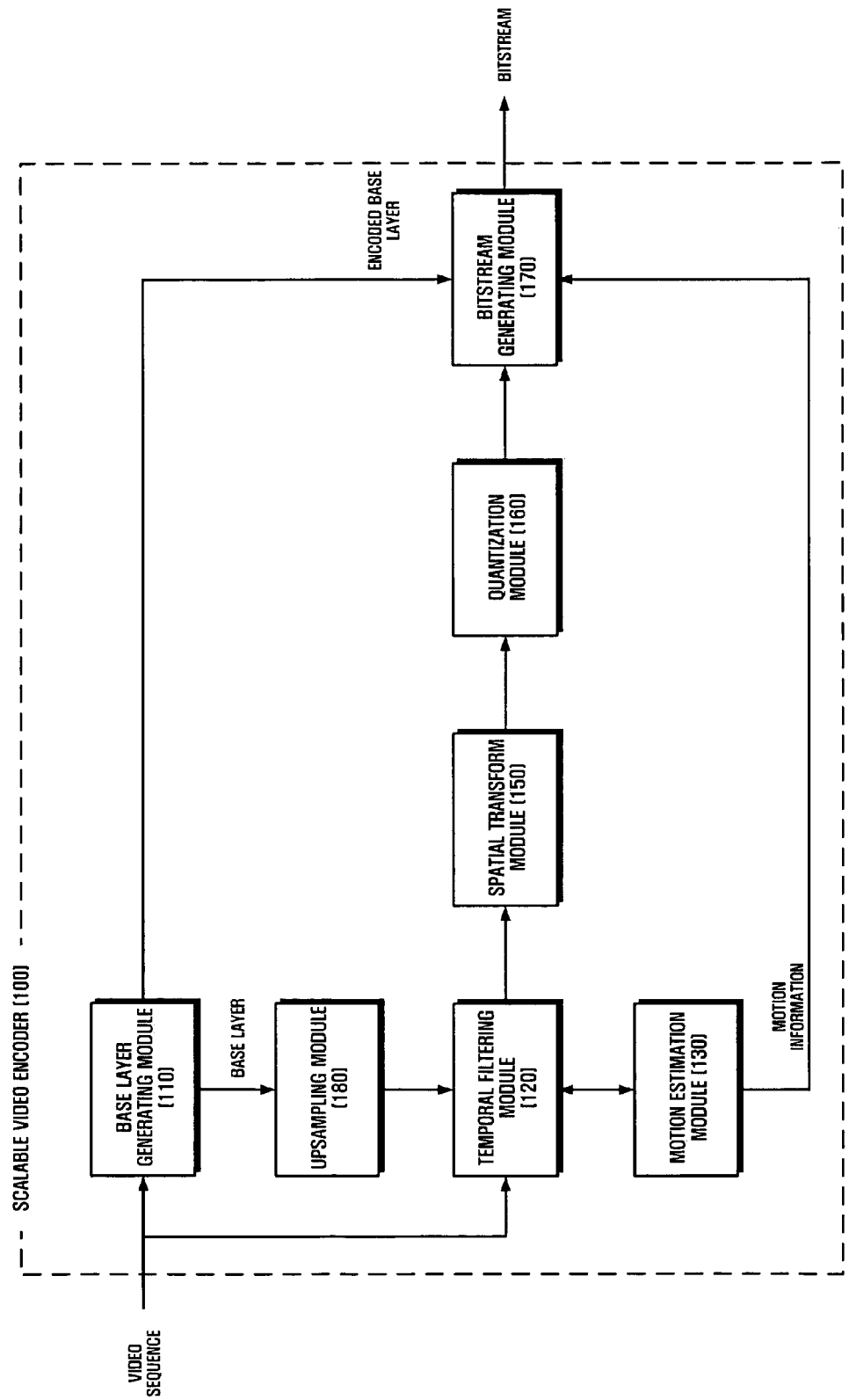
FIG. 2 is a diagram of a scalable video encoder according to an embodiment of the present invention.

Referring to FIG. 2, a scalable video encoder 100 according to an exemplary embodiment of the present invention includes a base layer generating module 110, a temporal filtering module 120, a motion estimation module 130, a spatial transform module 150, a quantization module 160, a bitstream generating module 170, and an upsampling module 180.

A video sequence is input into the base layer generating module 110 and the temporal filtering module 120. The base layer generating module 110 downsamples the input video sequence into the lowest frame rate and the lowest resolution to the lowest frame rate and the lowest resolution to generate a base layer, encodes the base layer using a predetermined codec, and provides the encoded base layer to the bitstream generating module 170. The base layer generating module 110 provides the generated base layer to the upsampling module 180. Here, the downsampling may be performed in different ways. In particular, downsampling in resolution may be performed using wavelet transform.

The temporally and spatially downsampled video sequence, i.e., the base layer, may be directly sent to the upsampling module 180. Alternatively, the base layer encoded and then decoded with the same codec may be provided to the upsampling module 180 to avoid mismatch with a base layer reconstructed by a decoder. That is, the temporally and spatially downsampled video sequence or the video sequence encoded and decoded will be provided to the upsampling module 180, both of which are collectively referred to as a "base layer".

The codec may be a non-wavelet-based H.264 or MPEG-4 codec providing excellent quality at a low bit-rate. Providing the 'excellent quality' means that an image reconstructed after compression becomes little distorted from an original image. A peak signal-to-noise ratio (PSNR) is commonly used as a measure of video quality.

The upsampling module 180 upsamples the base layer generated by the base layer generating module 110 to a resolution equal to that of a frame to be subjected to temporal filtering. The upsampling may be performed using inverse wavelet transform.

The temporal filtering module 120 decomposes frames into low-pass and high-pass frames in the direction of a temporal axis to remove redundancies that exist within the frames. In the present invention, the temporal filtering module 120 performs filtering in the direction of a temporal axis as well as filtering using a difference between the upsampled version of the base layer and a frame. The filtering in the direction of a temporal axis is referred to as temporal residual coding and filtering using a difference from the upsampled version of the base layer as difference coding. That is, the temporal filtering operation includes temporal residual coding in the direction of a temporal axis and difference coding using the base layer.

The motion estimation module 130 performs motion estimation using a reference frame. The temporal filtering module 120 causes the motion estimation module 130 to perform motion estimation whenever necessary and to return the result of motion estimation to the temporal filtering module 120. As a temporal filtering algorithm, MCTF or UMCTF may be used.

Figure 3:
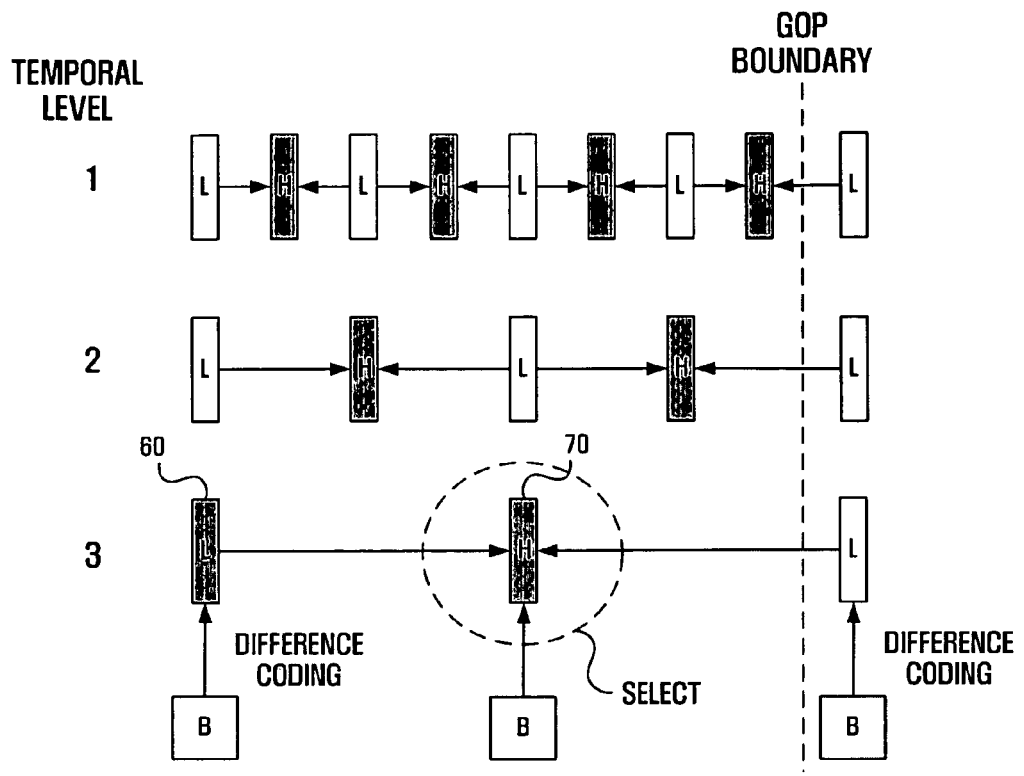
FIG. 3 is a diagram for explaining a temporal filtering process performed by an encoder according to an exemplary embodiment of the present invention.

FIG. 3 illustrates a temporal decomposition process in MCTF (using a 5/3 filter). Here, one GOP consists of eight frames, and frames from the previous or next GOP are used as a reference. Referring to FIG. 3, first, at temporal level 1, eight frames are decomposed into four low-pass frames (L frames) and four high-pass frames (H frames). The H frame is predicted using reference frames at either left or right side or at both sides. Then, the L frame is updated using H frames at both sides. In the update step, the L frame is not an original frame but is updated using H frames to distribute an error concentrated in the H frame evenly among the frames. However, since the update step is not an essential feature of the present invention, it will be hereinafter described that the L frame is an original frame without being updated.

Next, at temporal level 2, the four L frames are decomposed into two L frames and two H frames. Lastly, at temporal level 3, the two L frames at temporal level 2 are decomposed into one L frame 60 and one H frame 70. Then, one L frame at the highest temporal level and seven H frames are encoded for transmission.

An interval corresponding to a frame having the lowest frame rate at the highest temporal level is subjected to filtering other than simple temporal residual coding. That is, the L frame 60 and the H frame at temporal level 3 within the current GOP are filtered out using difference coding. The H frame 70 may be filtered out by temporal residual coding using temporally-related frames as a reference. Filtering is performed for each block of a predetermined pixel size having a predetermined pixel size by selecting a better technique of temporal residual coding and difference coding for the block.

Rate-Distortion (R-D) optimization is used to select the optimal coding mode. Since the temporal residual coding allows the use of forward, backward, and bi-directional predictive modes, a coding mode that minimizes a cost function is determined for each block among forward coding, backward coding, bi-directional coding, and difference coding.

When Eb, Ef, Ebi, and Ei respectively denote mean absolute differences (MADs) computed when backward predictive mode, forward predictive mode, bi-directional predictive mode, and B-intra mode using a base layer as a reference are used, Bb, Bf, Bbi, and Bi respectively denote bits additionally allocated to the respective coding modes, and $\lambda$ is a Lagrangian coefficient, cost functions for the respective coding modes are defined by Equation (1):

$$Cb = Eb + \lambda \times Bb$$

$$Cf = Ef + \lambda \times Bf$$

$$Cbi = Ebi + \lambda \times Bbi = Ebi + \lambda \times (Bb + Bf)$$

$$C_i = \alpha(E_i + \lambda \times B_i) \approx \alpha \times E_i \quad (1)$$

While Bb, Bf, Bbi respectively represent bits allocated to compress backward, forward, and bi-directional motion information including motion vectors and reference frames, Bi is very small negligible value because a motion vector is not used for the intra-coding. The Lagrangian coefficient λ is a constant determined according to a compression ratio.

While Bb, Bf, Bbi respectively represent bits allocated to compress backward, forward, and bi-directional motion information including motion vectors and reference frames, Bi is very small negligible value because a motion vector is not used for the intra-coding. The Lagrangian coefficient λ is a constant determined according to a compression ratio.

A mode selecting module (not shown) selects a mode that minimizes a cost function so as to determine the best mode in encoding the H frame at the highest temporal level. In equation (1), Greek character a denotes a constant representing a selection frequency of the B-intra mode. When α=1, the B-intra mode is selected as often as the other coding modes. As α increases, the frequency of selection of B-intra mode decreases. As α decreases, the frequency of selection of B-intra mode increases.

Figure 4:
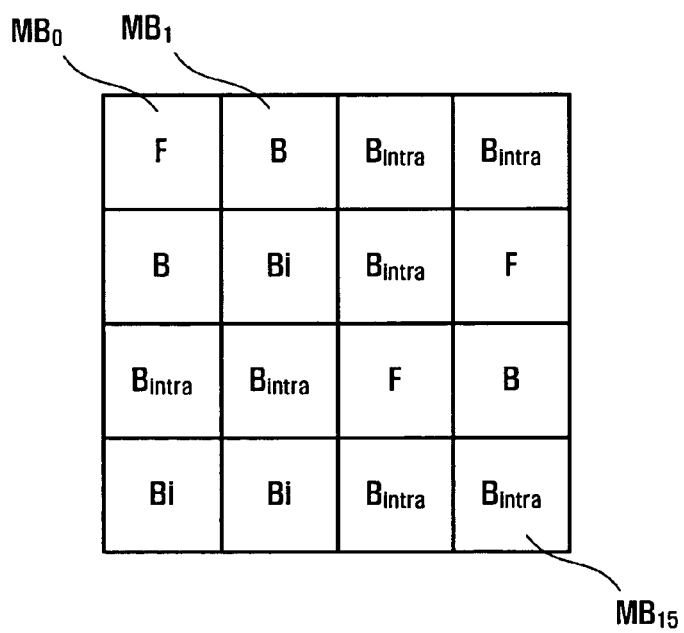
FIG. 4 shows an example in which each block in a high-pass frame at the highest temporal level is encoded in different ways according to a cost function.

FIG. 4 shows an example in which each block in an H frame at the highest temporal level is encoded in different ways according to a cost function. A frame is divided into 16 blocks. MB denotes a block and F, B, Bi, and $B_{intra}$ respectively denote filtering in forward predictive mode, backward predictive mode, bi-directional predictive mode, and B-intra mode.

Referring to FIG. 4, a block $MB_0$ is filtered using a forward predictive mode since a cost function Cf is a minimum value among costs functions Cb, Cf, Cbi and Ci. A block $MB_{15}$ is filtered using the B-intra mode since a cost function Ci is a minimum value.

Turning to FIG. 2, the motion estimation module 130 is invoked by the temporal filtering module 120 to perform motion estimation on a current frame using a reference frame determined by the temporal filtering module 120 and determines a motion vector. A block-matching algorithm is commonly used for motion estimation. In the block-matching algorithm, pixels in a current block are compared with pixels of a search area in a reference frame to obtain the best-matching block with a minimum error and a displacement from the best-matching block in the reference frame with respect to the current block is determined as a motion vector. While a fixed-size block matching is used for motion estimation as shown in FIG. 4, a hierarchical variable size block matching (HVSBM) may be used. The motion estimation module 130 provides motion information including a block size, a motion vector, and a reference frame number obtained as a result of the motion estimation to the bitstream generating module 170.

The spatial transform module 150 uses a spatial transform supporting spatial scalability to remove spatial redundancies from a frame in which temporal redundancies have been removed by the temporal filtering module 120. A wavelet transform is commonly used for the spatial transform. Coefficients obtained by the spatial transform are called transform coefficients.

In more detail, the spatial transform module 150 uses wavelet transform to decompose a frame from which temporal redundancies have been removed into low-pass and high-pass subbands and produces wavelet coefficients for the low-pass and high-pass subbands.

Figure 5:
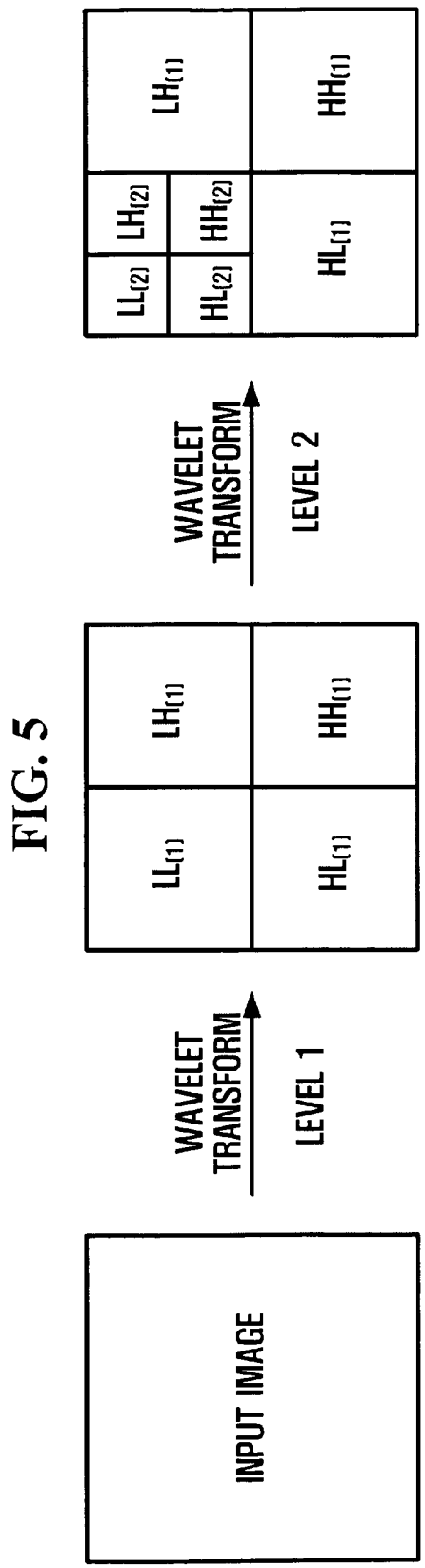
FIG. 5 illustrates an example of a process of decomposing an input image into subbands by wavelet transform.

FIG. 5 illustrates an example of a process of decomposing an input image or frame into subbands at two levels by wavelet transform. Referring to FIG. 5, at level one, wavelet transform is performed to decompose the input image or frame into one low-pass subband and three horizontal, vertical, and diagonal high-pass sub-bands. The low-pass subband that is low frequency in both horizontal and vertical directions is referred to as "LL" while the high-pass subbands in horizontal, vertical, and both horizontal and vertical directions are referred to as "LH", "HL", and "HH", respectively. The low-pass subband LL can be further decomposed iteratively. A number within the parenthesis denotes the level of wavelet transform.

The quantization module 160 quantizes the transform coefficients produced by the spatial transform module 150. Quantization is a process of converting transform coefficients represented by arbitrary real numbers into discrete values by dividing the transform coefficients by a predetermined number of blocks, and matching the discrete values into predetermined indices. In particular, when a wavelet transform is used for spatial transformation, embedded quantization can be often used. Examples of such embedded quantization algorithm may include Embedded ZeroTrees Wavelet (EZW), Set Partitioning in Hierarchical Trees (SPIHT), and Embedded ZeroBlock Coding (EZBC).

The bitstream generating module 170 losslessly encodes the encoded base layer data from the base layer generating module 110, the transform coefficients quantized by the quantization module 160, and the motion information generated by the motion estimation module 130 into an output bitstream. For lossless encoding, various techniques such as arithmetic encoding and variable-length encoding may be used.

Figure 6:
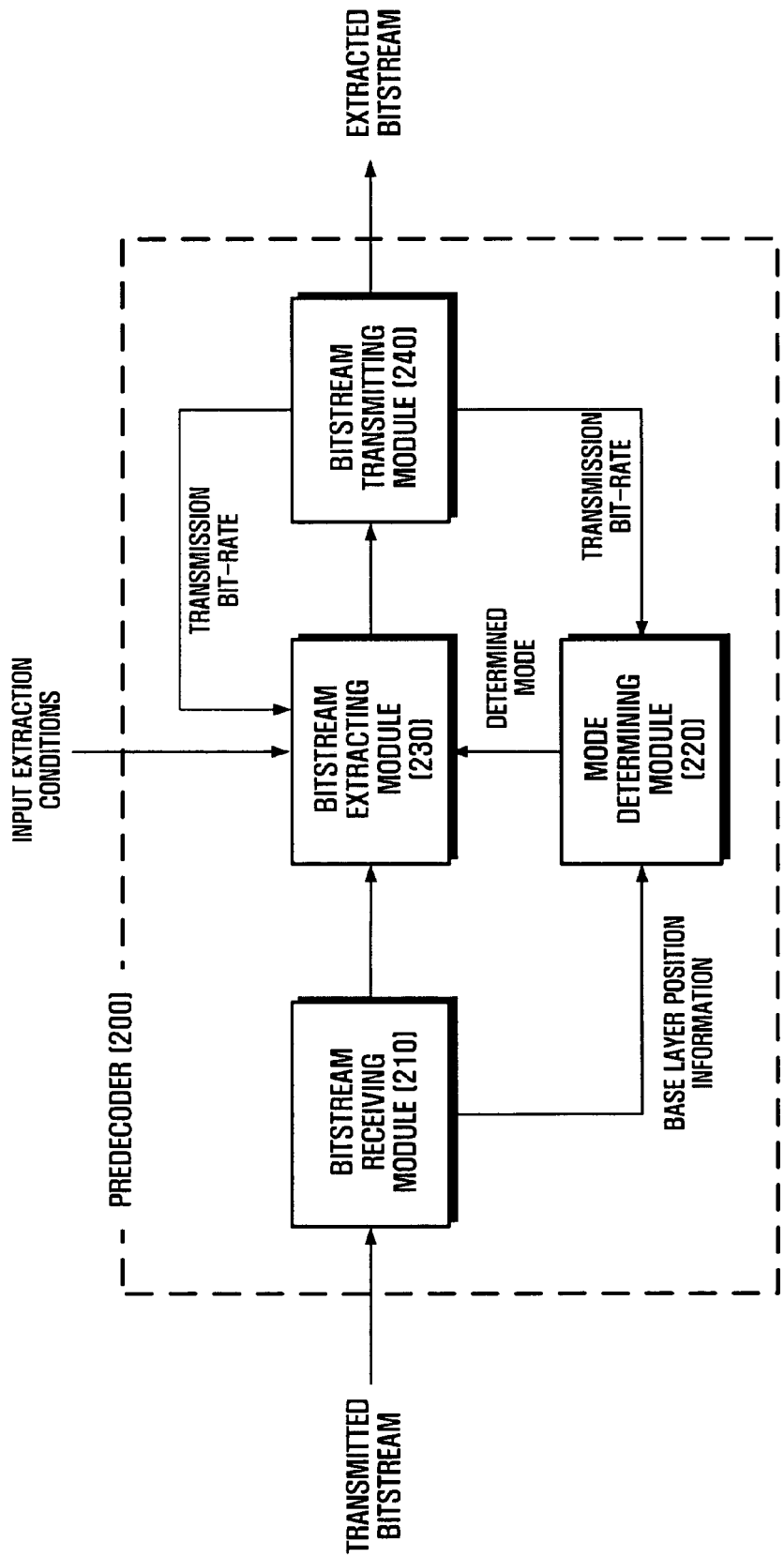
FIG. 6 is a diagram of a predecoder according to an exemplary embodiment of the present invention.

FIG. 6 is a diagram of a predecoder 200 according to an exemplary embodiment of the present invention. The predecoder 200 may also be called a transcoder or an extractor. Similarly, varying quality, resolution, or frame rate by extracting a part of a bitstream received from the encoder (100 of FIG. 2) according to the extraction conditions such as quality, resolution or frame rate, i.e., implementing scalability in terms of quality, resolution, or frame rate, is called predecoding, transcoding, or extracting.

Referring to FIG. 6, the predecoder 200 includes a bitstream receiving module 210, a mode determining module 220, a bitstream extracting module 230, and a bitstream transmitting module 240.

The bitstream receiving module 210 receives a bitstream generated by the encoder 100 via any type of network.

Figure 7:
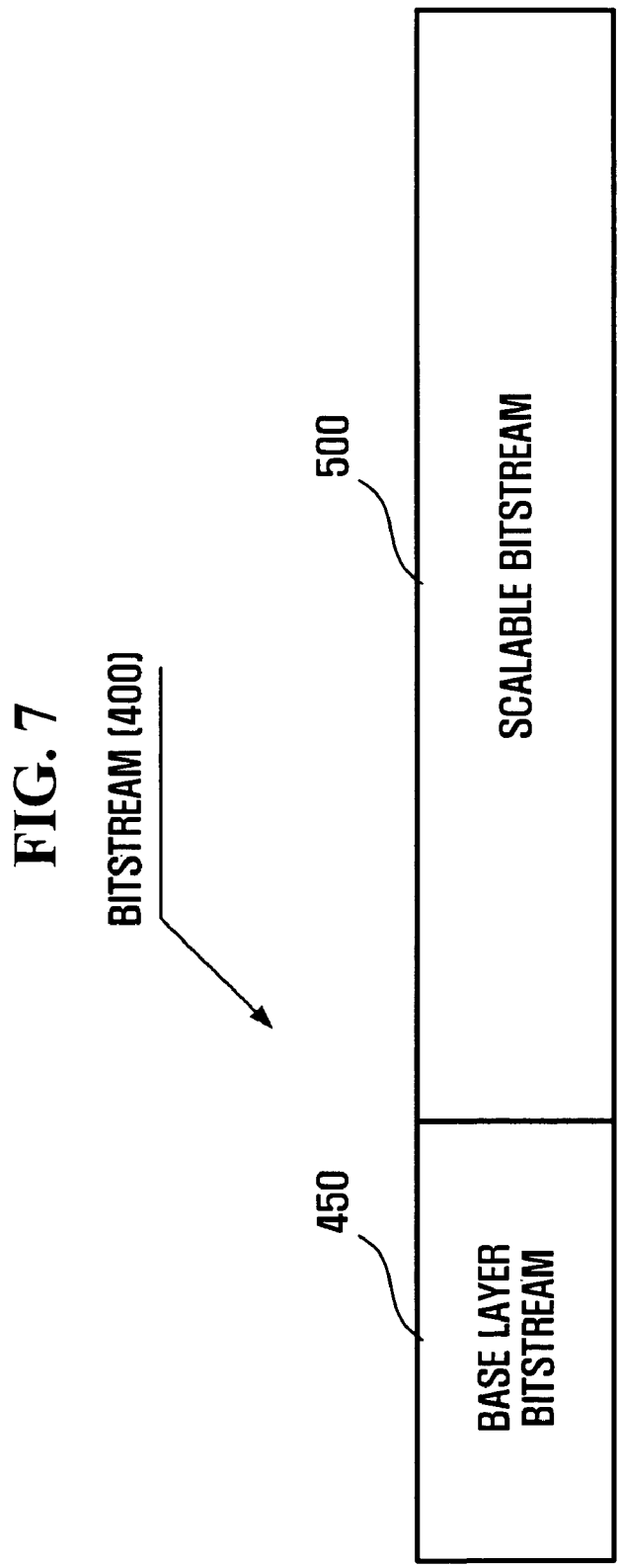
FIG. 7 illustrates the structure of a bitstream received from an encoder.

FIG. 7 illustrates the structure of a bitstream 400 received from the encoder 100. Referring to FIG. 7, the bitstream 400 includes a base layer bitstream 450 obtained by losslessly encoding an encoded base layer and a temporally and spatially scalable bitstream 500 obtained by losslessly encoding transform coefficients sent from the quantization module (160 of FIG. 2).

Figure 8:
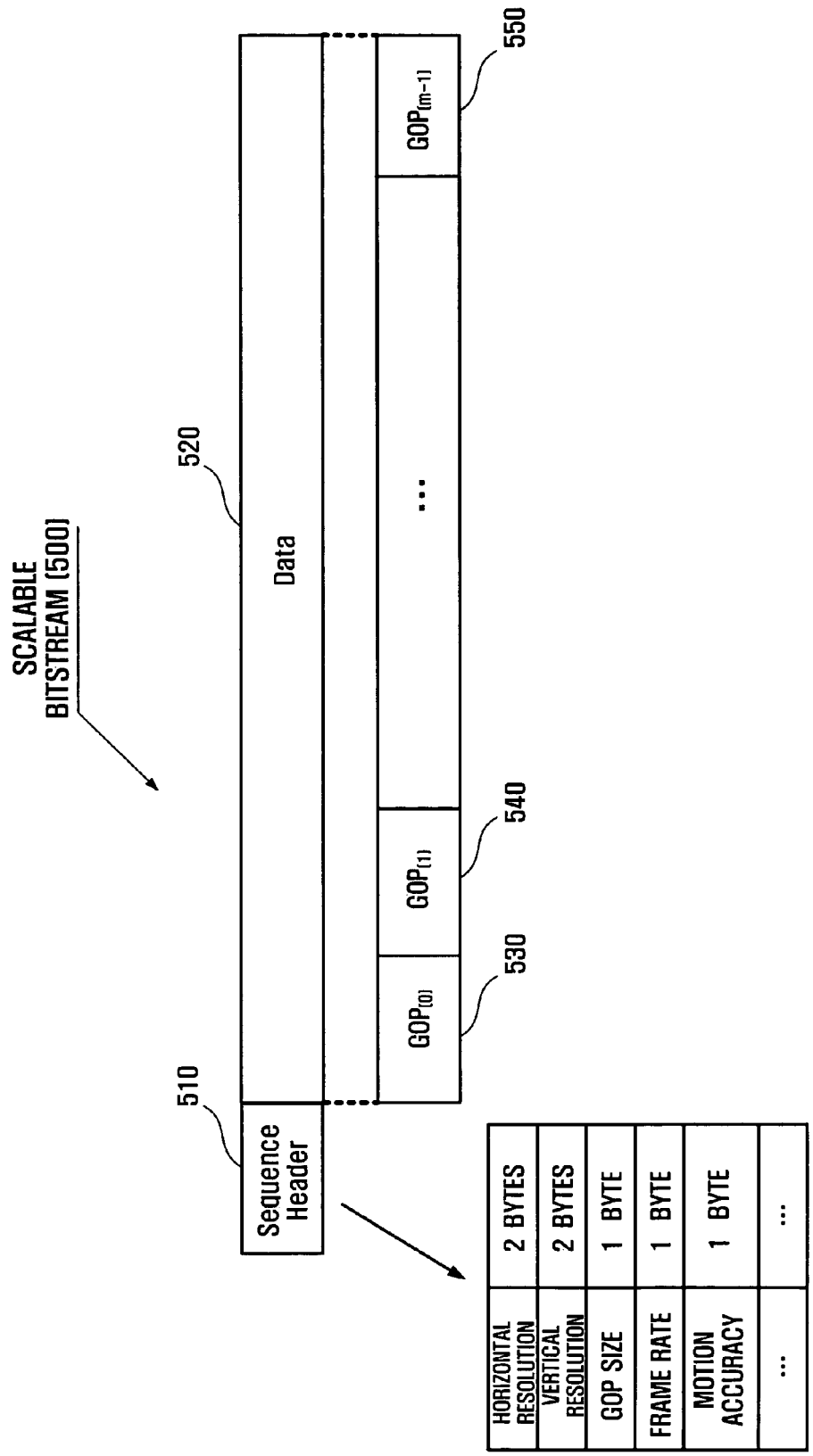
FIG. 8 schematically illustrates the structure of a scalable bitstream.

FIG. 8 schematically illustrates the structure of the scalable bitstream 500. Referring to FIG. 8, the scalable bitstream 500 consists of a sequence header field 510 and a data field 520 containing at least one GOP field 530 through 550. The sequence header field 510 specifies image properties such as frame width (2 bytes) and height (2 bytes), a GOP size (1 byte), and a frame rate (1 byte). The data field 520 specifies image data representing images and other information (motion information) needed to reconstruct the images.

Figure 9:
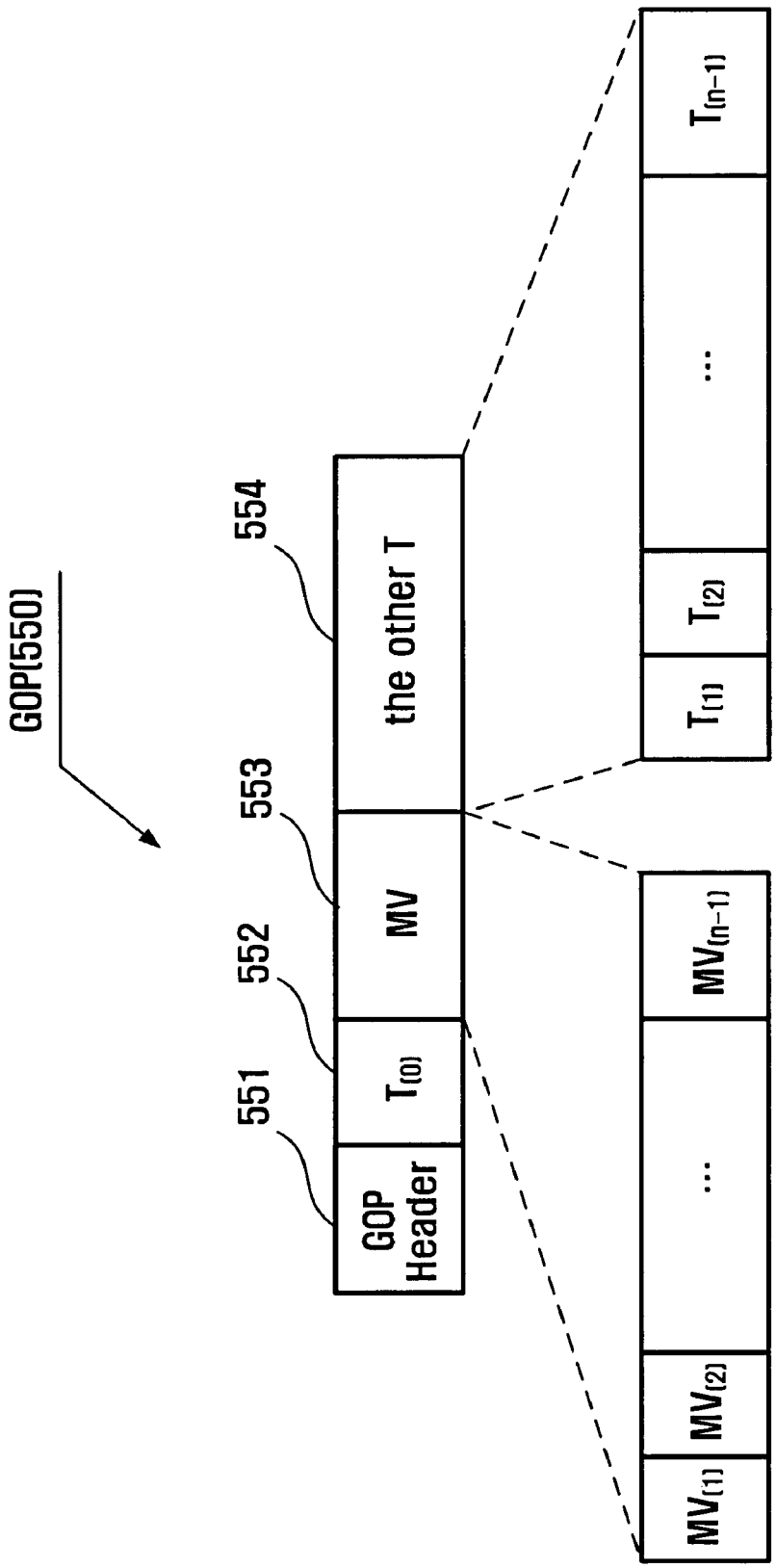
FIG. 9 illustrates the detailed structure of a group-of-picture (GOP) field.

FIG. 9 illustrates the detailed structure of each GOP field 550. Referring to FIG. 9, the GOP field 550 consists of a GOP header 551, a $T_{(0)}$ field 552 specifying information on a frame temporally encoded without reference to another frame, a motion information MV field 553 specifying motion information and mode information, and a 'the other T' field 554 specifying information on frames encoded with reference to another frame. The motion information contains block sizes, motion vectors associated with blocks, and numbers indicating reference frames used to calculate the motion vectors. The reference frame number may be a number indicating one of temporally related frames or a number indicating a base layer frame (a number not used to indicate other frames) when difference coding is used. In this way, there is a reference frame but no motion vector for a block created by the difference coding.

The MV field 553 consists of $MV_{(1)}$ through $MV_{(n-1)}$ fields corresponding to frames. The other T field 554 includes $T_{(1)}$ through $T_{(n-1)}$ fields specifying data representing images for frames. Here, n denotes the size of a GOP. While it is described with reference to FIG. 9 that the GOP begins with a low-pass frame, two or more low-pass frames may exist according to a temporal estimation mode selected in the encoder (100 of FIG. 2) or may be located at a different position than the start of the GOP.

Referring back to FIG. 6, the mode determining module 220 determines a frame to be skipped in extracting a portion of the scalable bitstream 500 in the transmitted bitstream 400. The frame skipping technique is defined as an 'enhanced skip mode'. The fundamental idea of the enhanced skip mode is that an encoder encodes a video signal using temporal prediction or prediction using a base layer.

The predecoder 200 skips all texture information and motion information associated with a frame corresponding to a base layer frame at a low target bitrate. The texture information is a frame produced by temporal residual coding or difference coding. The motion information includes motion vectors, reference frame numbers, and block sizes.

The enhanced skip mode is divided into three modes. In mode 1 in which a target bit rate is sufficient, all frames are transmitted without being skipped. In mode 3 in which a target bit-rate is below a threshold, all frames having corresponding base layer are skipped. In mode 2 operating at intermediate bit-rate, high-pass frames are skipped among the frames having corresponding base layers while a low-pass frame containing essential information is not skipped.

The enhanced skip mode may be divided into these three modes according to various criteria. For example, the enhanced skip mode may be classified according to a transmissible bit-rate, i.e., a target bit-rate, determined based on information about the transmission condition of a network connected to a decoder.

Figure 10:
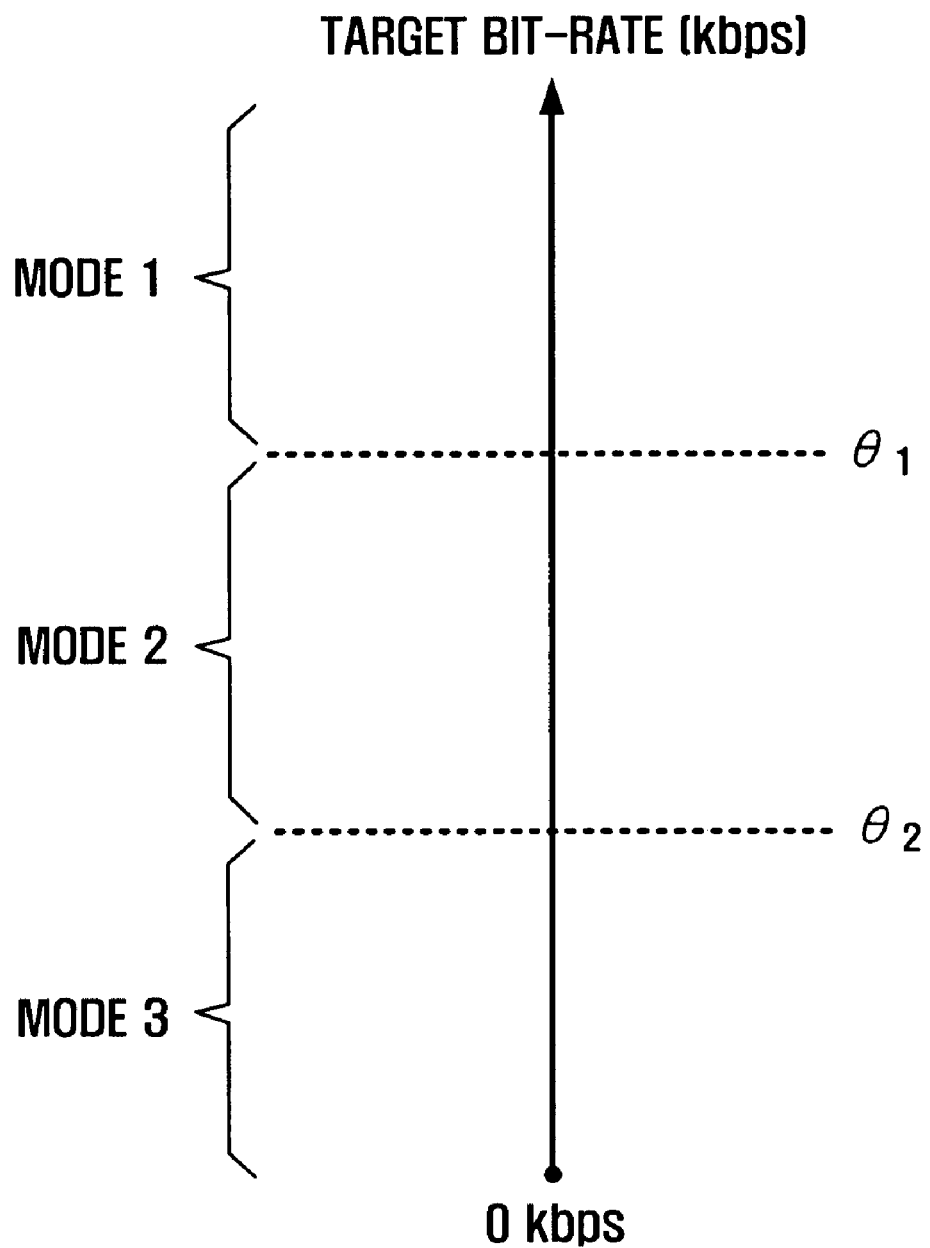
FIG. 10 is a diagram for explaining a process of applying different modes according to a target bit-rate.

FIG. 10 is a diagram for explaining a process of determining a mode according to a target bit-rate. Referring to FIG. 10, first and second thresholds $\theta_1$ and $\theta_2$ are set for the target bit-rate. When the bit-rate is determined to exceed the first threshold $\theta_1$ based on the condition of transmission to the decoder, mode 1 is applied. When the target bit-rate is less than the second threshold $\theta_2$, mode 3 is applied. When the target bit-rate is between the first and second thresholds $\theta_1$ and $\theta_2$, mode 2 is applied.

Turning to FIG. 6, the bitstream extracting module 230 extracts a portion of the scalable bitstream 500 in the bitstream 400 according to an enhanced skip mode determined by the mode determining module 220 and extraction conditions and generates a bitstream to be transmitted to a decoder. Here, the extraction conditions include quality, resolution, or frame rate and may be determined based on user input or information about transmission bit-rate that can be obtained from the bitstream transmitting module 240. In the present invention, a portion of the scalable bitstream 500 is extracted according to both the determined enhanced skip mode and the extraction conditions. That is, when the enhanced skip mode is applied to skip some frames, the remaining frames are extracted according to the extraction conditions. Thus, bits saved by the skipped frames are allocated to the remaining frames, thereby improving the coding performance.

Figure 11:
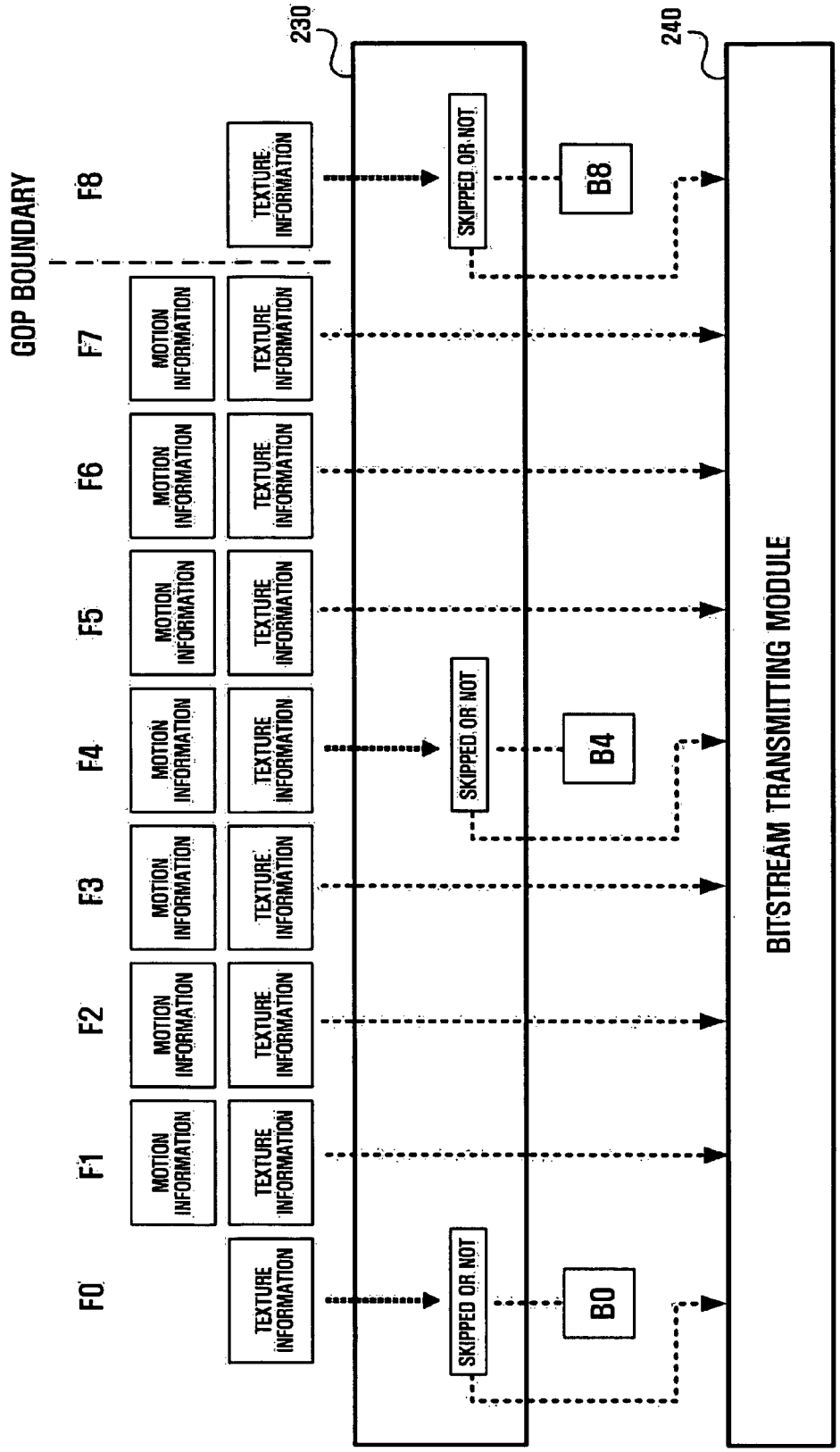
FIG. 11 shows an example of operation of a bitstream extracting module.

FIG. 11 shows an example of operation of the bitstream extracting module 230. Here, F0, F1, . . . , and F8 denote sequentially-numbered frames and B denotes a base layer. Frames F0 and F8 are low-pass frames subjected to difference coding using the base layer B.

When the mode 1 is determined by the mode determining module 220, the bitstream extracting module 230 transmits original texture information or both texture information and motion information to the bitstream transmitting module 240 without considering a base layer. When the mode 3 is determined, texture information or both texture information and motion information associated with frames F0, F4, and F8 having corresponding base layer B0, B4, B8 are all skipped and not transmitted to the bitstream transmitting module 240. It can be checked whether a frame has a corresponding base layer using information about frame numbers or frame rates associated with the base layer. The information may be recorded in a portion of the base layer bitstream 450.

When mode 2 is determined by the mode determining module 220, the bitstream extracting module 230 skips texture information and motion information associated with high-pass frame F4 among the frames F0, F4, and F8 while transmitting texture information associated with low-pass frames F0 and F8 to the bitstream transmitting module 240. Here, while it is described above that one low-pass and one high-pass frame having corresponding base layers exist within a GOP, it will be readily apparent to those of ordinary skill in the art that a different number of low-pass and high-pass frames may exist at different positions depending on a method of generating a base layer in the encoder (100 of FIG. 2).

Figure 12:
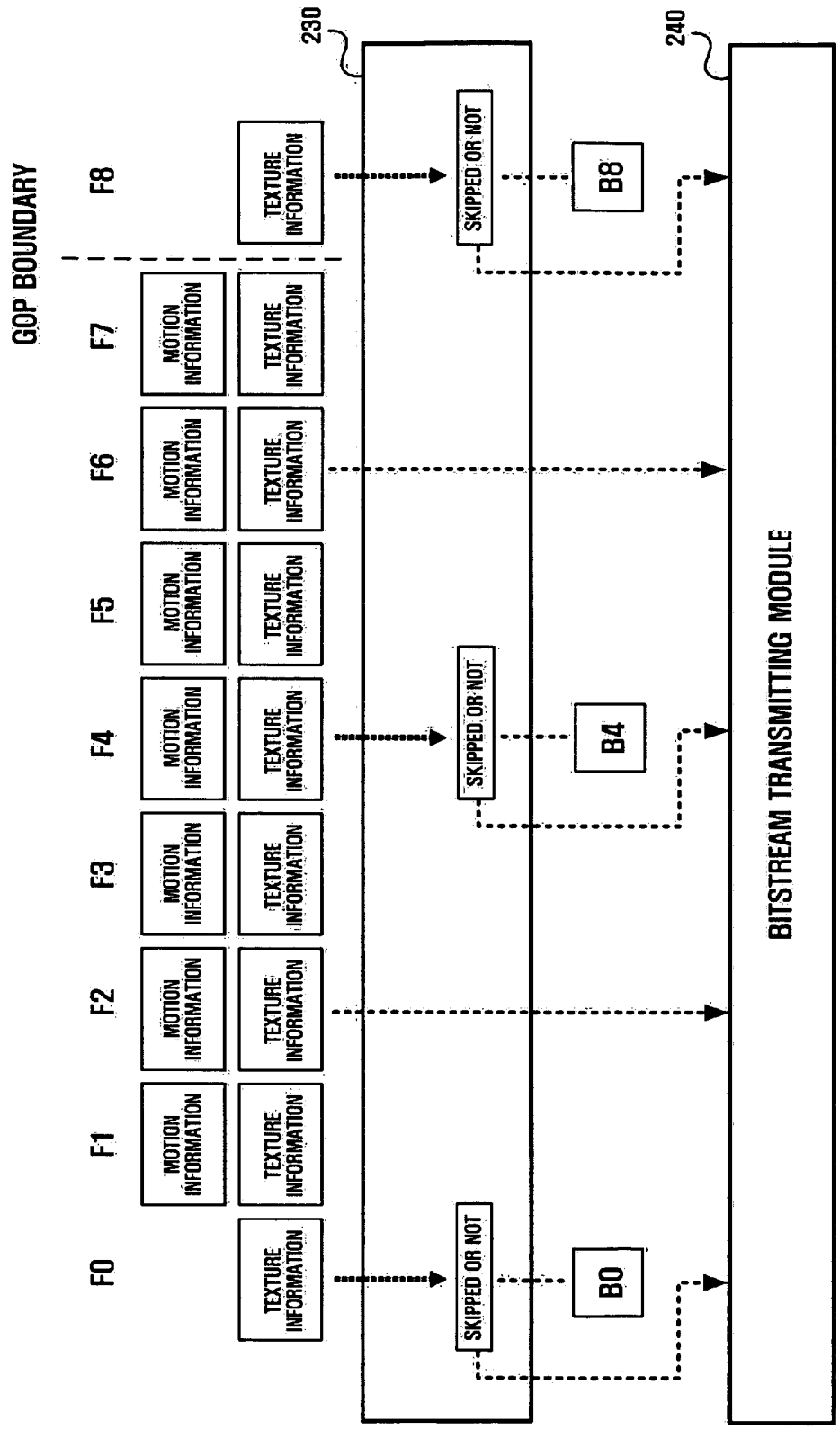
FIG. 12 shows another example of operation of the bitstream extracting module.

FIG. 12 shows another example of operation of the bitstream extracting module 230, illustrating only frames of temporal level 2 extracted from the original scalable bitstream 500, in consideration of the enhanced skip mode and the extraction conditions. It is possible to extract frames of a specific temporal level or all frames at reduced resolution or image quality.

In mode 2 or mode 3 in which some frames are skipped, bits saved by the skipped frames can be allocated to other frames in order to increase a frame rate, resolution or quality for the frames.

Figure 13:
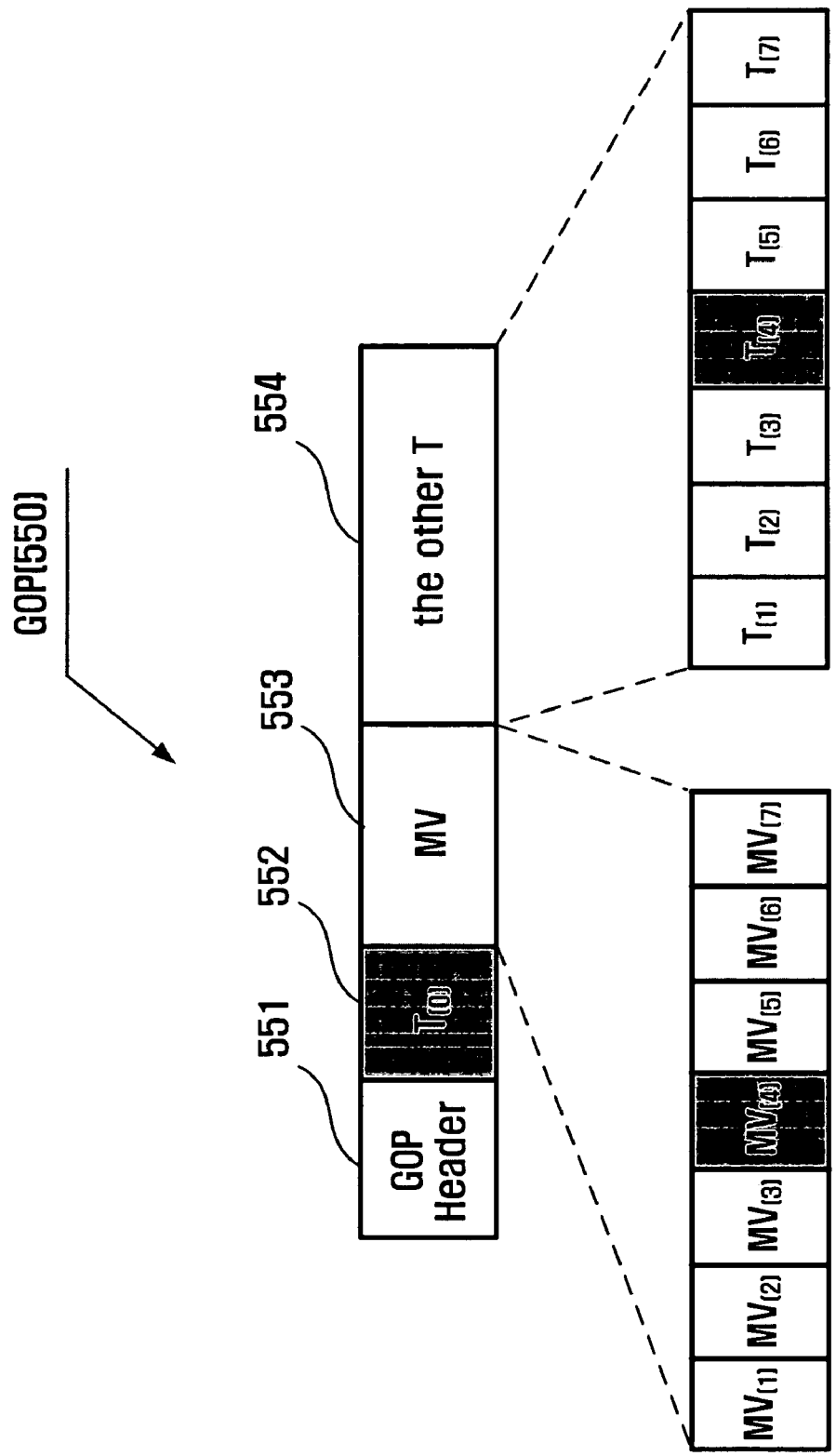
FIG. 13 illustrates the structure of a GOP field before being changed according to an extraction process performed by a bitstream extracting module.
Figure 14:
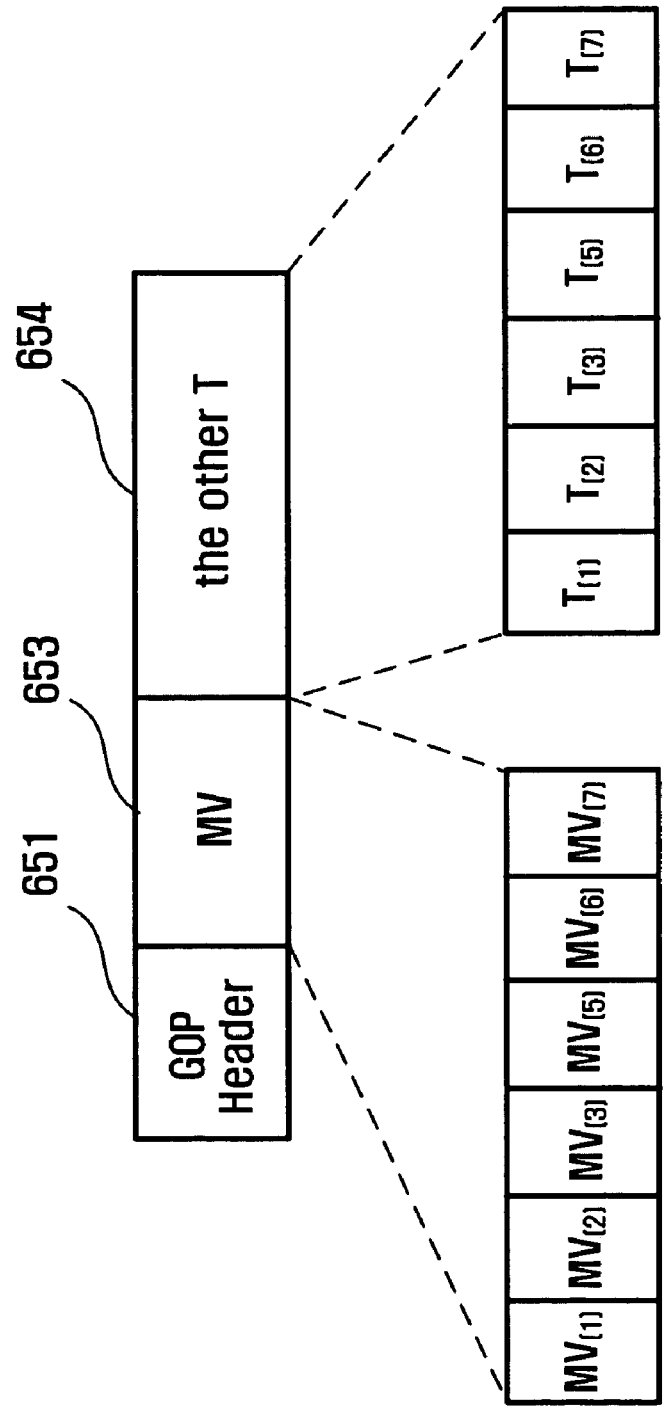
FIG. 14 illustrates the structure of a GOP field modified according to an extraction process performed by a bitstream extracting module in mode 3.

FIG. 13 illustrates the structure of a GOP field 550 before being modified according to the extraction process performed by the bitstream extracting module 230 illustrated in FIG. 11. While no frames are skipped (some frames may be skipped according to a frame rate) in mode 1, texture information T(0) associated with frame F0 and motion information MV(4) and texture information T(4) associated with frame F4 are skipped in mode 3. Frame F8 is not shown in FIG. 13, because FIG. 13 only shows frames within a GOP. The structure of a modified GOP field 650 specifying information remaining after shadowed information is omitted according to the mode 3 is shown in FIG. 14.

Figure 15:
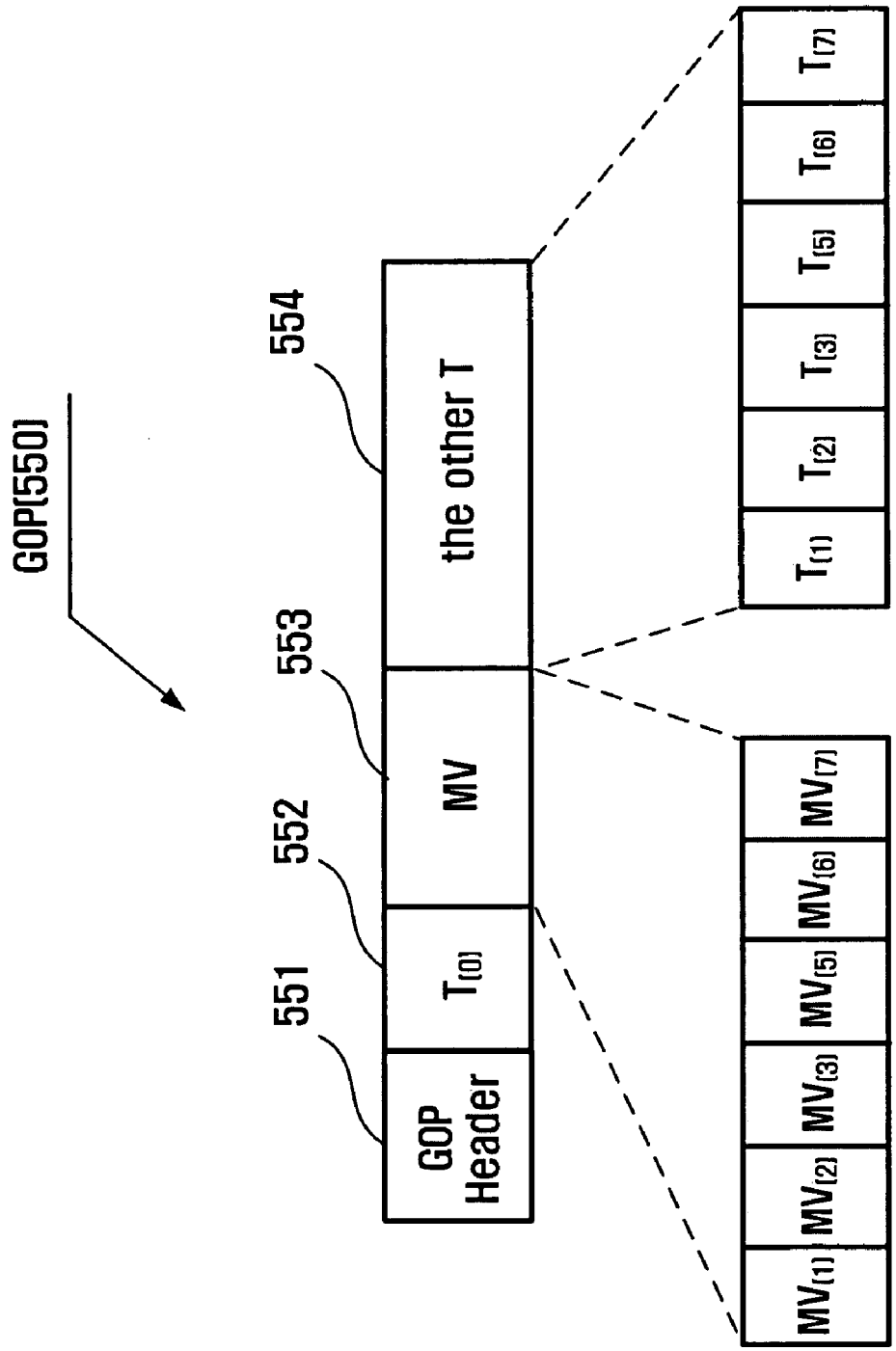
FIG. 15 illustrates the structure of a GOP field changed according to an extraction process performed by a bitstream extracting module in mode 2.

Meanwhile, in mode 2 in which only information on a high-pass frame among frames having corresponding base layers are skipped, motion information MV(4) and texture information T(4) associated with the frame F4 are omitted. The structure of a modified GOP field 550 specifying information remaining after the information on the high-pass frame is omitted is illustrated in FIG. 15.

As described above, the bitstream extracting module 230 skips some frames for each GOP according to mode information in order to modify the scalable bitstream 500, extracts a new bitstream, and transmits the bitstream to the bitstream transmitting module 240. The bitstream transmitting module 240 sends the bitstream extracted through the bitstream extracting module 230 to a decoder via a wired/wireless network.

Figure 16:
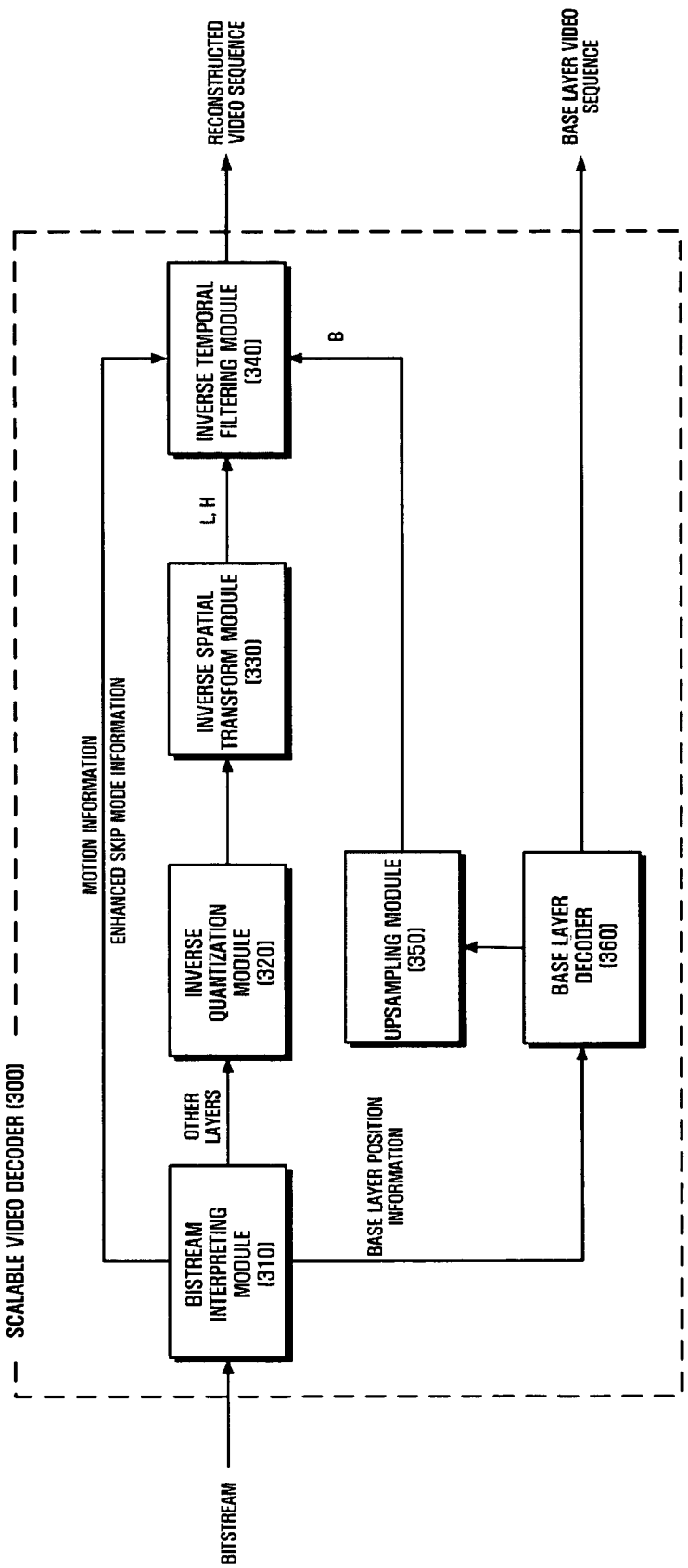
FIG. 16 is a diagram of a scalable video decoder according to an exemplary embodiment of the present invention.

FIG. 16 is a diagram of a scalable video decoder 300 according to an exemplary embodiment of the present invention. The scalable video decoder 300 includes a bitstream interpreting module 310, an inverse quantization module 320, an inverse spatial transform module 330, an inverse temporal filtering module 340, an upsampling module 350, and a base layer decoder 360.

Referring to FIG. 16, the bitstream interpreting module 310 performs the inverse operation of entropy encoding by interpreting an input bitstream and extracting information about a base layer separately from information about other layers. The information about the base layer is provided to the base layer decoder 360. Texture information in the information about other layers is sent to the inverse quantization module 320 while motion information and enhanced skip mode information are sent to the inverse temporal filtering module 340.

The base layer decoder 360 decodes the information about the base layer received from the bitstream interpreting module 310 using a predetermined codec. The predetermined codec is a codec corresponding to that used for encoding, such as an H.264 or MPEG-4 codec providing excellent performance at a low bit-rate.

The upsampling module 350 upsamples a base layer frame reconstructed by the base layer decoder 360 to a resolution equal to a frame to be subjected to inverse temporal filtering. The upsampling operation may be performed in various ways. The upsampling module 350 may perform the inverse of resolution downsampling performed in the encoder (100 of FIG. 2). For example, if downsampling is performed using wavelet transform in the encoder 100, upsampling is performed using inverse wavelet transform. Not being an essential component, the upsampling module 350 may not operate when the resolution of the base layer is equal to that of the frame to be subjected to the inverse temporal filtering.

The inverse quantization module 320 applies inverse quantization to the texture information received from the bitstream interpreting module 310 and outputs transform coefficients. The inverse quantization is the process of obtaining quantized coefficients from matching quantization indices received from the encoder 100. A mapping table between indices and quantized coefficients may be received from the encoder 100 or be predetermined between the encoder 100 and the decoder 300.

The inverse spatial transform module 330 performs inverse spatial transform to inversely transform the transform coefficients into transform coefficients in a spatial domain. For example, for the wavelet transform, the transform coefficients are inversely transformed from the wavelet domain to the spatial domain.

The inverse temporal filtering module 340 performs inverse temporal filtering on the transform coefficients in the spatial domain, i.e., residual frames, using the motion information and enhanced skip mode information received from the bitstream interpreting module 310 and the base layer received from the base layer decoder 360 and reconstructs frames making up a video sequence.

The inverse temporal filtering module 340 performs inverse temporal filtering on frames skipped according to the enhanced skip mode after replacing the skipped frames with base layer corresponding thereto.

Figure 17:
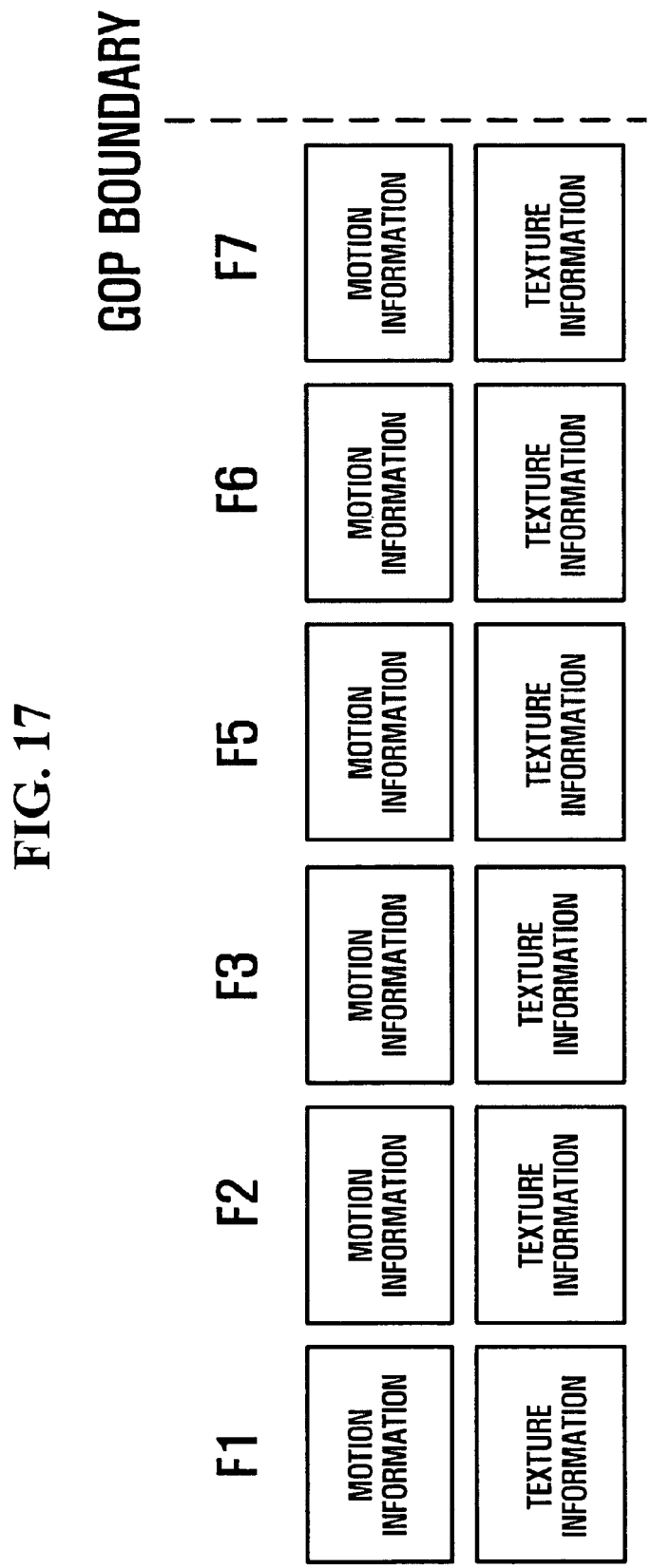
FIG. 17 illustrates motion information and texture information for frames in a GOP remaining after some frames are skipped by a predecoder according to mode 3 as shown in FIG. 14.

FIG. 17 illustrates motion information and texture information for frames in a GOP remaining after some frames are skipped by the predecoder 200 according to mode 3 as shown in FIG. 14. That is, frames F0 and F4 are skipped and do not exist in the GOP. Thus, before performing inverse temporal filtering, the skipped frames should be reconstructed.

Figure 18:
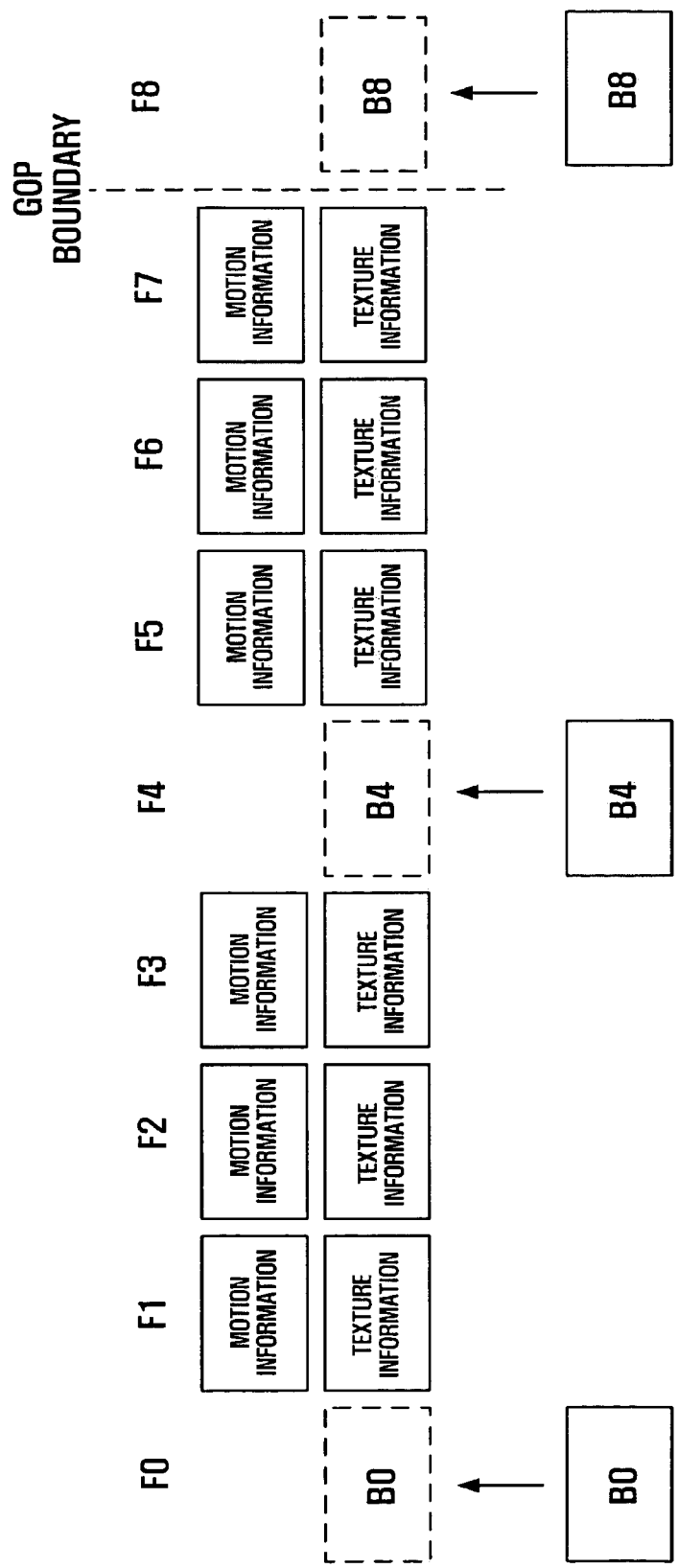
FIG. 18 is a diagram for explaining a process of reconstructing the frames skipped as shown in FIG. 17 using a base layer.

FIG. 18 is a diagram for explaining a process of reconstructing the frames skipped as shown in FIG. 17 using a base layer.

The base layer reconstructed by the base layer decoder 360 may be output directly as a video sequence having the lowest frame rate and resolution. The reconstructed base layer are also sent to the inverse temporal filtering module 340 to reconstruct frames other than the base layer. Referring to FIG. 18, the skipped frames F0, F4, and F8 are reconstructed using base layers B0, B4, and B8 reconstructed by the base layer decoder 360. The positions (0, 4, and 8) of the base layer B0, B4, and B8 can be identified using frame numbers or frame rates associated with the base layer contained in the base layer bitstream 450. When the reconstructed base layer has a different resolution from a pertinent frame to be subjected to inverse temporal filtering, the base layer is upsampled by the upsampling module 350 and inserted into the position of the frame. The frames F0, F4, and F8 reconstructed using the base layer B0, B4, and B8 are not residual frames but complete low-pass frames. Thus, like in temporal filtering performed in the encoder (100 of FIG. 2), the remaining high-pass frames F1, F2, F3, F5, F6, and F7 is to be inverse temporal filtered using the low-pass frames F0, F4, and F8 reconstructed using the base layer and other previously reconstructed frames as a reference. All reconstructed frames make up a single video sequence.

Here, the inverse temporal filtering is an inverse operation to temporal filtering performed in the encoder 100. When difference coding is used for temporal filtering, the inverse temporal filtering is performed by calculating the sum of a residual frame and a corresponding base layer. On the other hand, when temporal residual coding is for temporal filtering, the inverse temporal filtering is performed by calculating the sum of a residual frame and a predicted frame obtained using a reference frame number and a motion vector.

It has been described above with reference to FIGS. 17 and 18 that frames skipped according to the mode 3 are reconstructed using base layers. When mode 2 is applied to skip high-pass frames, the skipped high-pass frames may be reconstructed using base layers. For the mode 1 in which no frame is skipped, the inverse temporal filtering module 340 does not require the use of base layers.

As used herein, the term 'module' means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Figure 19:
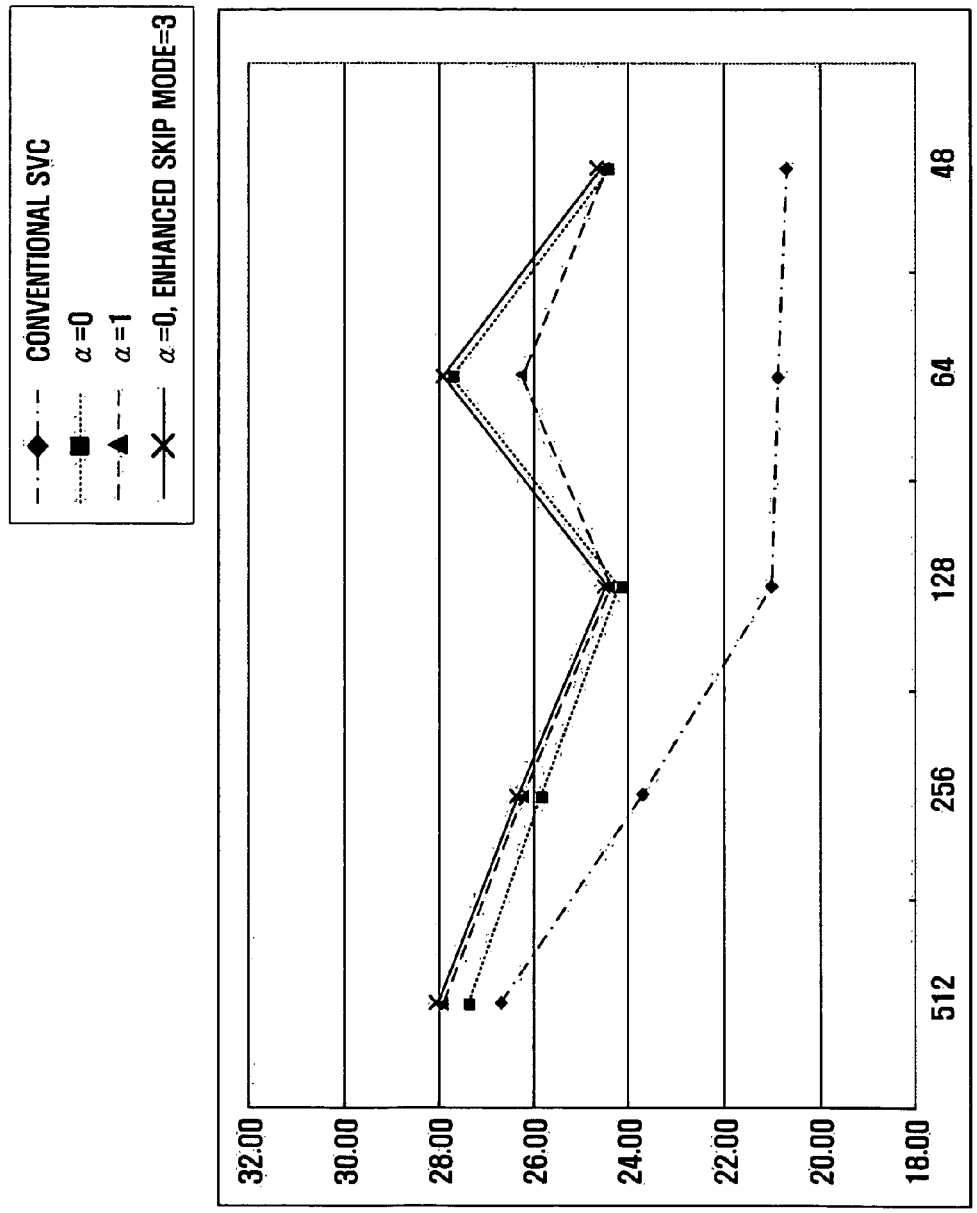
FIG. 19 is a graph of peak signal-to-noise ratio (PSNR) vs. bit-rate for Mobile sequence.

FIG. 19 is a graph of PSNR vs. bit-rate for Mobile sequence. As evident from FIG. 19, a coding method according to the present invention exhibits similar performance to conventional scalable video coding (SVC) at a high bit-rate but significantly higher performance than the same at a low bit-rate. Coding performance when α=1 (temporal residual coding or difference coding is used) is slightly higher at high bit-rate but slightly lower at low bit-rate than coding performance when α=0 (only difference coding is used). However, the former is equal to the latter at the lowest bit-rate (48 Kbps).

When α=0 and enhanced skip mode 3 is used, coding performance is similar to coding performance when α=0 at low bit-rate and to coding performance when α=1 at high bit-rate. That is, an enhanced skip mode is used additionally to achieve excellent performance at both low and high bit-rates.

Scalable video coding according to exemplary embodiments of the present invention provides high performance at both low and high bit-rates.

In addition, according to exemplary embodiments of the present invention, the quality of a reconstructed video sequence can be improved by skipping bits of some frames during predecoding and allocating the bits to other frames.

While certain specific exemplary embodiments of the invention have been described in detail, it will be apparent to those skilled in the art that the above described exemplary embodiments are provided for purposes of illustration only and not to be construed as a limitation of the invention. Therefore, the scope of the invention is given by the appended claims, rather than the preceding description, and all variations and equivalents which fall within the range of the claims are intended to be embraced therein.

What is claimed is:

1. A method for decoding a bitstream containing a plurality of layers, the method comprising:
reconstructing at least one frame on a base layer by applying a predetermined coder/decoder (codec) to information about the base layer in the bitstream;
generating at least one residual frame including at least one skipped frame using information other than the base layer in the bitstream;
inserting the at least one frame on the base layer into at least one respective position of the at least one skipped frame; and
performing inverse temporal filtering on the inserted at least one frame on the base layer and the at least one residual frame and reconstructing a video sequence,
wherein the inverse temporal filtering is performed by using a first sum of the at least one frame on the base layer and a corresponding residual frame when difference coding is used to generate the corresponding residual frame and by using a second sum of the corresponding residual frame and a predicted frame obtained from a reference frame number and a motion vector when temporal predictive coding is used to generate the corresponding residual frame.

2. The method of claim 1, wherein the generating of the at least one residual frame comprises:
performing inverse quantization on texture information other than the base layer in the bitstream and outputting at least one first transform coefficient; and
inversely transforming the at least one first transform coefficient into at least one second transform coefficient in a spatial domain.

3. The method of claim 1, wherein the at least one frame on the base layer is inserted after being upsampled to the resolution of the corresponding residual frame.

4. The method of claim 3, wherein the upsampling is performed using inverse wavelet transform.

5. The method of claim 1, wherein the predetermined codec is a H.264 (Advanced Video coding) codec.

6. A video decoder for decoding a bitstream containing a plurality of layers, the video decoder comprising:
a base layer decoder reconstructing the at least one frame on a base layer by applying a predetermined coder/decoder (codec) to information about the base layer in the bitstream;
an inverse spatial transform module generating at least one residual frame including at least one skipped frame using information other than the at least one base layer in the bitstream; and
an inverse temporal filtering module inserting the at least one frame of the base layer into the respective positions of the at least one skipped frame and performing inverse temporal filtering on the inserted frame on the base layer and the at least one residual frame in order to reconstruct a video sequence,
wherein the inverse temporal filtering module obtains a sum of the at least one frame on the base layer and the at least one residual frame when difference coding is used to generate the at least one residual frame and obtains a sum of the at least one residual frame and a predicted frame obtained from a reference frame number and a motion vector when temporal predictive coding is used to generate the at least one residual frame.

7. The video decoder of claim 6, wherein the at least one frame on the base layer is inserted after being upsampled to the resolution of the at least one residual frame.

* * * * *